Oct. 6, 1931.  F. H. MUELLER  1,826,323
COMBINED DRILL, REAMER, AND TAP
Filed Feb. 19, 1930
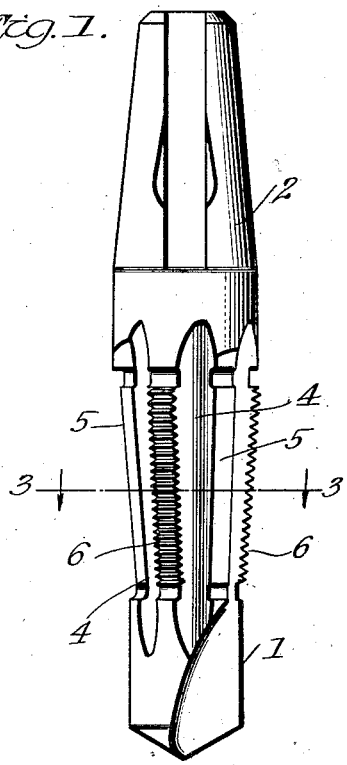
Fig. 1.
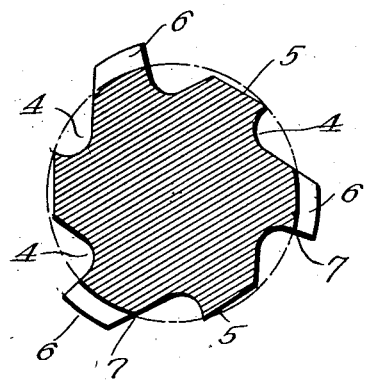
Fig. 3.
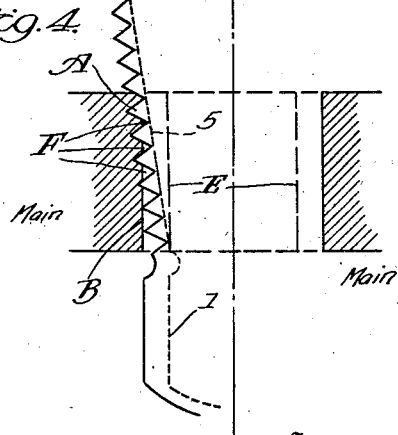
Fig. 4.
Fig. 2.
Inventor
Frank H. Mueller Patented Oct. 6, 1931

1,826,323

UNITED STATES PATENT OFFICE

FRANK H. MUELLER, OF DECATUR, ILLINOIS, ASSIGNOR TO MUELLER CO., OF DECATUR, ILLINOIS, A CORPORATION OF ILLINOIS

COMBINED DRILL, REAMER, AND TAP

Application filed February 19, 1930. Serial No. 429,664.

The present invention relates to improvements in tools, particularly designed for preparing fluid supply pipes, such as water or gas mains, with internally threaded openings designed to receive corporation stops.

With tools for this purpose, as heretofore constructed, it has not been possible to readily provide a gas or water main, for example, with an opening which would make a perfect joint throughout the entire length of the thread formed on a tapered corporation stop or other fitting.

The tools commonly employed for such work heretofore have included a drill section of considerably greater diameter than the lower end of the tap section, and the joint effected by such a tool is not entirely satisfactory because it necessarily provides a very limited extent of engagement with the thread of the corporation stop when fitted within the opening.

The present invention has for its object to provide an improved construction of tool for the purpose stated, which will have the several parts so arranged that a hole produced by the drill section will be tapered and internally threaded to insure a perfect joint with the corresponding thread of a brass corporation stop or other fitting, the parts being so related that the reamer blades cut ahead of the tap or threading cutters, whereby the latter are relieved from cutting metal other than that necessary actually to form the thread.

With the foregoing and other objects in view, the accompanying drawings illustrate a tool constructed in accordance with the present invention.

Figure 1 is an elevation of a tool embodying the invention.

Figure 2 is an end elevation of the drill end of the tool.

Figure 3 is a transverse section substantially on the line 3—3 of Figure 1.

Figure 4 is a diagrammatic view illustrating the operation of the improved tool in comparison with tools heretofore commonly employed.

Referring to the drawings, in the several figures of which like parts are designated by the same reference character, it will be seen that the improved tool comprises a longitudinally tapered body section, which is arranged above a drill section 1, and below a section 2, shaped to be engaged by a suitable boring bar or socket.

As shown, the body section of the tool is gradually tapered or increased in diameter upward from the drill portion 1, and in said section are formed a series of longitudinally extending grooves 4, between which are formed reamer blades 5, and tap or thread cutting sections 6.

As shown, the blades 5 are arranged alternately with the thread cutters, and the channels or grooves 4 provide spaces to clear chips or particles of metal removed by the reamer blades and thread cutters.

As shown, the drill section 1 is adapted to form a cylindrical bore, and the tapered cutting section of the tool has at its lower end substantially the same diameter as the opening produced by said drill section.

Referring to Figure 3 of the drawings, it will be seen that the radius of the edge of each of the reamer blades is the same as the radius to the root 7 of the thread formed by the associated cutters 6, and the relation between the blades 5 and cutters 6 is such that the blades cut ahead of the tap and the members 6 thereof merely remove the relatively small amount of metal actually necessary to form the tapered thread.

By providing the tapered reaming blades, and causing them to extend throughout the length of the tap or thread cutters, the opening formed by the drill section 1 is gradually enlarged and simultaneously threaded with the expenditure of a minimum amount of power.

One of the objections to implements or tools for the same purpose as heretofore constructed has been that the tap portion of the tool was required to cut away a considerable excess of metal, and could only be forced into a hole of uniform diameter formed in a main to a limited distance.

Advantages of the invention, hereinbefore referred to, will be readily apparent from the diagrammatic view (Fig. 4).

This view illustrates the action of a tool such as heretofore commonly employed and one embodying the present invention, the old style tool being shown in full lines and the improved tool by dotted lines.

It will be seen that with the old style tool the only perfect thread formed in the main is the one indicated at A. The others are flattened until at the point B there is no thread at all. This condition could be remedied by making the drill portion of the tool of less diameter except for the fact that if that were done the threading tool would choke in the middle of the main and it would be impossible to force it down far enough to cut the thread indicated at A.

However, by providing the tool with the reamer blades 5, as illustrated in Figures 1 to 3, it will be seen that the tool is enabled to cut a perfect thread throughout the thickness of the wall of the main. In the diagrammatic view, (Fig. 4) the smaller diameter hole initially produced by the drill section 1 is indicated by the reference character E.

As before noted the great disadvantage of a joint such as produced by the old style tool referred to in which only one thread engages the corporation stop is that fluid from the main will enter the spaces indicated at F and unless the joint at A is perfect there will be such a leakage as will make it necessary to remove the corporation stop and insert another.

While I have shown and described the invention as particularly adapted for preparing fluid supply pipes with internally threaded openings, it will be understood that this disclosure is illustrative only, and the tool is adapted for use wherever tapped openings are to be formed.

I claim:

1. A tool for the purpose described, comprising a lower drill section, a plurality of circumferentially spaced, longitudinally tapered, reamer blades above the drill section, adapted to provide a tapering enlargement of an opening formed by said drill section, and a series of cutters in each of the spaces between the reamer blades for threading the tapered surface formed by said blades, the edges of the blades and thread cutters being so related that the cutters only remove from the tapered surface sufficient metal to form the thread.

2. A tool for the purpose described, comprising a lower drill section, a plurality of circumferentially spaced, longitudinally tapered, reamer blades above the drill section, adapted to provide a tapering enlargement of an opening formed by said drill section, and a series of cutters in each of the spaces between the reamer blades for threading the tapered surface formed by said blades, the radius of the edge of each reaming blade at any point in the length of the blade being substantially the same as the radius to the root of the thread formed by the cutters at the same distance from the drill section.

3. A tool for the purpose described, comprising a drill section, a reamer blade gradually inclined outwardly from its lower end, and a series of following thread cutters spaced from and of substantially the same length as said reamer blade, said series being inclined outwardly from its lower end at substantially the inclination of said reamer blade, the outer edge of said reamer blade substantially coinciding in its radial distance from the axis of the tool throughout its length with that of the root or bottom of the thread cutters.

In testimony whereof I have hereunto set my hand.

FRANK H. MUELLER.